(12) United States Patent
Garrido (10) Patent No.: US 6,250,704 B1
(45) Date of Patent: Jun. 26, 2001

(54) RELEASE MECHANISM FOR FOLD AND FLIP SEAT ASSEMBLY

(75) Inventor: Pascal Garrido, Gravehurst (CA)

(73) Assignee: Dura Automotive Systems Inc., Rochester Hills, MI (US)

( * ) Notice: Subject to any disclaimer, the term of this patent is extended or adjusted under 35 U.S.C. 154(b) by 0 days.

(21) Appl. No.: 09/372,951

(22) Filed: Aug. 12, 1999

(51) Int. Cl.$^7$ ........................................................ B60N 2/02
(52) U.S. Cl. ........................... 296/65.05; 296/65.03; 296/65.09; 296/65.13; 297/336
(58) Field of Search .................... 296/65.03, 65.05, 296/65.09, 65.13; 297/336, 335; 248/429

(56) References Cited

U.S. PATENT DOCUMENTS

| | | | |
|---|---|---|---|
| 3,328,069 | * | 6/1967 | Dumas . |
| 4,368,916 | * | 1/1983 | Blasin ................................. 297/341 |
| 4,484,776 | * | 11/1984 | Gokimoto et al. ................. 296/65 R |
| 4,512,609 | * | 4/1985 | Parsson ............................... 297/331 |
| 4,518,201 | * | 5/1985 | Wahlmann et al. ................. 297/316 |
| 4,627,656 | * | 12/1986 | Gokimoto et al. ................. 296/65 R |
| 4,636,003 | * | 1/1987 | Siebler ................................. 297/336 |
| 4,637,653 | * | 1/1987 | Yoshida et al. ...................... 297/334 |
| 4,695,094 | * | 9/1987 | Siebler ................................. 297/331 |
| 4,846,520 | * | 7/1989 | Acuto et al. ......................... 296/65.1 |
| 4,856,847 | * | 8/1989 | Kanai .................................. 297/331 |
| 4,880,268 | * | 11/1989 | Brambilla .......................... 296/65.1 |
| 5,280,987 | * | 1/1994 | Miller ................................. 296/65.1 |
| 5,364,152 | * | 11/1994 | Mastrangelo et al. ............. 296/65.1 |
| 5,611,589 | * | 3/1997 | Fujii et al. ............................ 296/64 |
| 5,634,686 | * | 6/1997 | Okazaki .............................. 297/336 |
| 5,662,368 | * | 9/1997 | Ito et al. ............................ 296/65.1 |
| 5,676,341 | * | 10/1997 | Tarusawa et al. .................. 248/430 |
| 5,711,505 | * | 1/1998 | Nemoto .............................. 248/424 |
| 5,797,575 | * | 8/1998 | Clausen .............................. 248/429 |
| 5,810,443 | * | 9/1998 | Blanchard ....................... 297/378.12 |
| 5,868,450 | * | 2/1999 | Hashimoto ...................... 296/65.09 |
| 5,868,451 | * | 2/1999 | Uno et al. ............................. 296/66 |
| 5,871,255 | * | 2/1999 | Harland et al. ...................... 297/257 |
| 5,915,778 | * | 6/1999 | Winkelhake et al. ............ 296/65.05 |
| 5,961,183 | * | 10/1999 | Smith et al. ......................... 297/322 |
| 6,000,742 | * | 12/1999 | Schaefer et al. .................. 296/65.09 |
| 6,065,804 | * | 5/2000 | Tanaka et al. ....................... 297/336 |

* cited by examiner

Primary Examiner—D. Glenn Dayoan
Assistant Examiner—Mickki D. Murray
(74) Attorney, Agent, or Firm—Robert K. Roth (57) ABSTRACT

A vehicle fold-and-flip seat assembly includes a first track and a second track supported for movement relative to the first track for horizontal seat adjustment. A seat bottom is supported on the second track for movement with the second track and is movable between a horizontal position and a vertical position. A seat back is supported on a pivot bracket mounted to the second track and pivots relative to the seat bottom between an upright position and a folded position. A first lever is rotatably supported on the second track to control the movement of the seat back between the upright and folded positions when selectively actuated by a control assembly. A latch mechanism is used to secure a rear portion of the first track to the vehicle structure and is movable between a latched position and an unlatched position. A second lever is rotatably supported on the second track to control the movement of the latch mechanism between the latched and unlatched positions when selectively actuated by the control assembly such that the seat bottom along with the folded seat back can be flipped from the horizontal position to the vertical position when the latch is in the unlatched position.

22 Claims, 14 Drawing Sheets

RELEASE MECHANISM FOR FOLD AND FLIP SEAT ASSEMBLY

BACKGROUND OF THE INVENTION

This application relates generally to a vehicle seat adjuster assembly for a vehicle seat having a seat back that is folded onto a seat bottom where the seat back and bottom are flipped upwardly to a stowed position to increase the available cargo space in a vehicle. More particularly, this invention relates to a seat adjuster assembly with a first lever portion that controls seat back pivotal movement and a second lever portion that controls a latch mechanism to allow the seat to be folded and flipped to the stowed position.

Seat track and adjuster arrangements for mounting seats within vehicles are generally well known. Most arrangements provide for a seat to be moved or adjusted in forward and rearward directions within a vehicle.

In many circumstances, it is desirable to have seats within a vehicle that include a seat back that is pivotally supported on a seat bottom such that the seat back can be folded forward and downward relative to the seat bottom. Such an arrangement is necessary, for example, in vehicles so that a passenger can have access into the area behind the seat. In some vehicles, the seat back can be pivoted downwardly and forwardly into a horizontal position and the seat bottom along with the seat back can be pivoted forwardly into a vertical position to increase available cargo space in a vehicle.

Seat adjuster assemblies that are used to mount the seat to the vehicle are often complex, especially when the adjusters include components to allow the seat back to be folded onto the seat bottom and then allow the seat bottom and back to be flipped to a stowed position. These complex adjuster assemblies require a great number of components, which increases the assembly time and the overall cost of the seat assembly. Also, these adjuster assemblies are bulky, requiring a significant amount of packaging space and are difficult for an occupant to access and operate.

Accordingly, it is desirable to provide a simplified and inexpensive seat adjuster assembly that includes allows horizontal adjustment of the seat position but which also includes the capability of moving the seat to a stowed position in the vehicle. It is also desirable for the adjuster assembly to be durable and easy to operate.

SUMMARY OF THE INVENTION

In general terms, this invention is a vehicle seat assembly with a seat back pivotally supported with respect to a seat bottom, and which is attached to the vehicle by a mounting assembly with a seat adjuster. The seat can be folded down and flipped upwardly to increase the available cargo space within a vehicle. The seat adjuster includes a mount movable between a horizontal position and a vertical position. A seat back member is pivotally supported with respect to the mount and movable between an upright position and a folded position. A first lever is rotatably supported with respect to the mount and controls the movement of the seat back member when selectively actuated by a control assembly. A latch mechanism secures a portion of the mount to a vehicle structure and is movable between a latched position and an unlatched position. A second lever is rotatably supported with respect to the mount and controls the movement of the latch mechanism when selectively actuated by the control assembly such that the mount can be moved from the horizontal position to the vertical position when the latch is in the unlatched position.

In a preferred embodiment of this invention, the vehicle seat assembly includes a first track, a second track supported for movement relative to the first track, a seat bottom supported on the second track for movement with the second track, and a seat back pivotally supported for pivotal movement relative to the seat bottom. The seat back is movable between an upright position and a folded position and the seat bottom is movable between a horizontal position and a vertical position or flipped position when the seat back has been moved to the folded position. The assembly includes a locking device that moves between a locked position where the second track is maintained in a selected position relative to the first track and an unlocked position where the second track is movable relative to the first track. The first lever is rotatably supported on the second track to control folding of the seat back. Once the seat back is folded down, the locking device is unlocked and the second track is moved to a rearwardmost position. The latch mechanism secures a rear portion of the first track to the vehicle structure and the second lever is rotatably supported on the second track to control the movement of the latch mechanism. After the seat back is folded onto the seat bottom and the second track has moved to a rearward position, the seat bottom, seat back, and tracks are flipped upwardly and forwardly when the latch mechanism is unlatched, thus moving the seat to a stowed position.

The subject invention offers several advantages over prior art systems because it provides a simplified seat adjuster for a fold and flip seat that significantly reduces the number of required components and decreases overall assembly cost. The subject invention is also advantageous because it is durable, easy to assemble, and is easy to operate.

These and other features and advantages of the present invention will be best understood from the following specification and drawings, the following of which is a brief description.

DETAILED DESCRIPTION OF THE PREFERRED EMBODIMENT

Figure 1A:
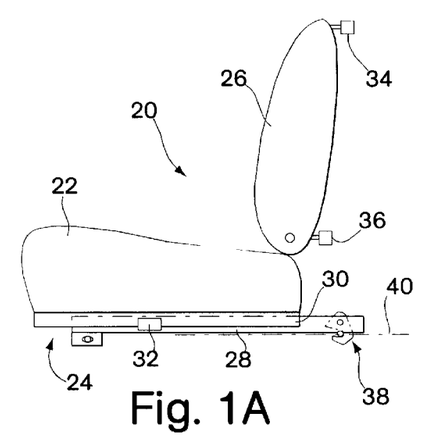
FIG. 1A is a side schematic view of a vehicle seat supported on a seat track in an upright position and adjusted forwardly on the tracks.

FIG. 1A illustrates a vehicle seat assembly 20. The seat assembly 20 includes a seat bottom 22 that is mounted within the vehicle on a mounting assembly 24. A seat back 26 is pivotally supported for pivotal movement relative to the seat bottom 22. The mounting assembly 24 includes track assemblies on an inboard side and an outboard side of the seat assembly 20, only the outboard side is shown. The mounting assembly includes a first track 28 and a second track 30. The second track 30 is slidably mounted on the first track 28 such that the seat 20 can be adjusted forwardly and rearwardly within the vehicle. A locking mechanism, shown schematically at 32, is used to fix the second track 30 relative to the first track 28 once the seat is in the desired position.

Figure 1B:
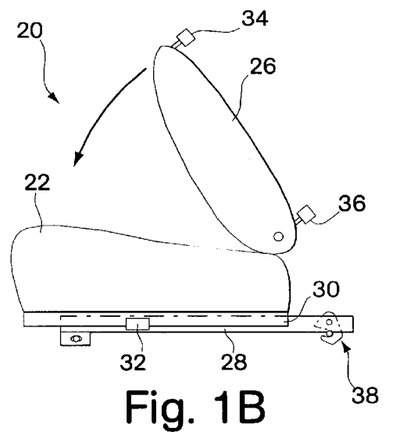
FIG. 1B is a side view of the seat of FIG. 1A with the seat back being folded downwardly toward the seat bottom.
Figure 1C:
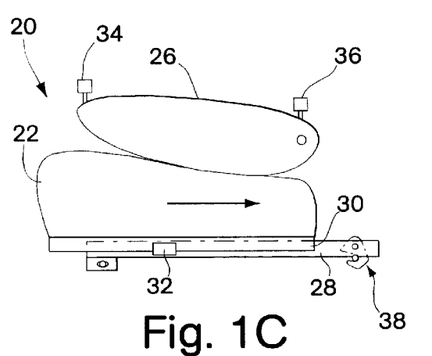
FIG. 1C is a side view of the seat of FIG. 1A with the seat back folded onto the seat bottom.

A first release 34 is actuated to allow the seat back 26 to be folded downwardly toward the seat bottom 22 as shown in FIG. 1B. The seat 20 can be in any horizontal adjusted position when the first release 34 is actuated. Once the first release 34 is actuated or when the seat back 26 reaches a full folded position, shown in FIG. 1C, the locking mechanism 32 is unlocked and the seat 20 is moved to the rearwardmost position on the tracks 38, 30, shown in FIG. 1D. If the seat 20 is adjusted forwardly in the vehicle, the seat back 26 may not be able to be folded onto the seat bottom 22 because it might hit a front seat in the vehicle. Thus, if the seat 20 is adjusted forwardly the locking mechanism 32 will unlock when the first release 34 is actuated so that the seat 20 can be slid back and the seat back 26 can be fully folded onto the seat bottom 22. If the seat 20 is adjusted rearwardly to allow full folding of the seat back 26, the locking mechanism 32 is unlocked to ensure that the seat 20 is in the rearwardmost position so that the mount can be unlatched.

Figure 1D:
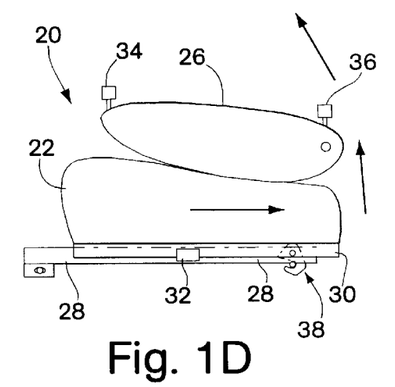
FIG. 1D is a side view of the seat of FIG. 1A with the folded seat adjusted to a rearwardmost position on the tracks.
Figure 1E:
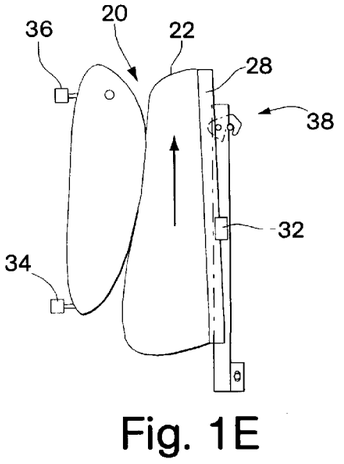
FIG. 1E is a side view of the seat of FIG. 1A with the seat bottom, seat back, and seat tracks flipped upwardly to a stowed position.

Once the locking mechanism 32 is unlocked and the seat 20 is slid rearwardly, as shown in FIG. 1D, the locking mechanism re-engages to securely lock the seat in the full rear position. A second release 36 is operably connected to a latch 38 that mounts the seat 20 to a vehicle floor 40. The second release 36 is actuated to unlatch the mounting assembly 24. After the seat 20 is unlatched, the seat 20 is pivoted from a horizontal position to a vertical position or stowed position, as shown in FIG. 1E. With the seat 20 in the stowed position, the cargo space in the vehicle is increased. Also, if the seat 20 is in the second row of seats in a vehicle having three rows of seats, when the seat 20 is in the stowed position it facilitates access to the third row of seats. To latch the seat 20 back to the vehicle floor, the seat 20 is flipped backward to automatically re-engage the latch.

Figure 2:
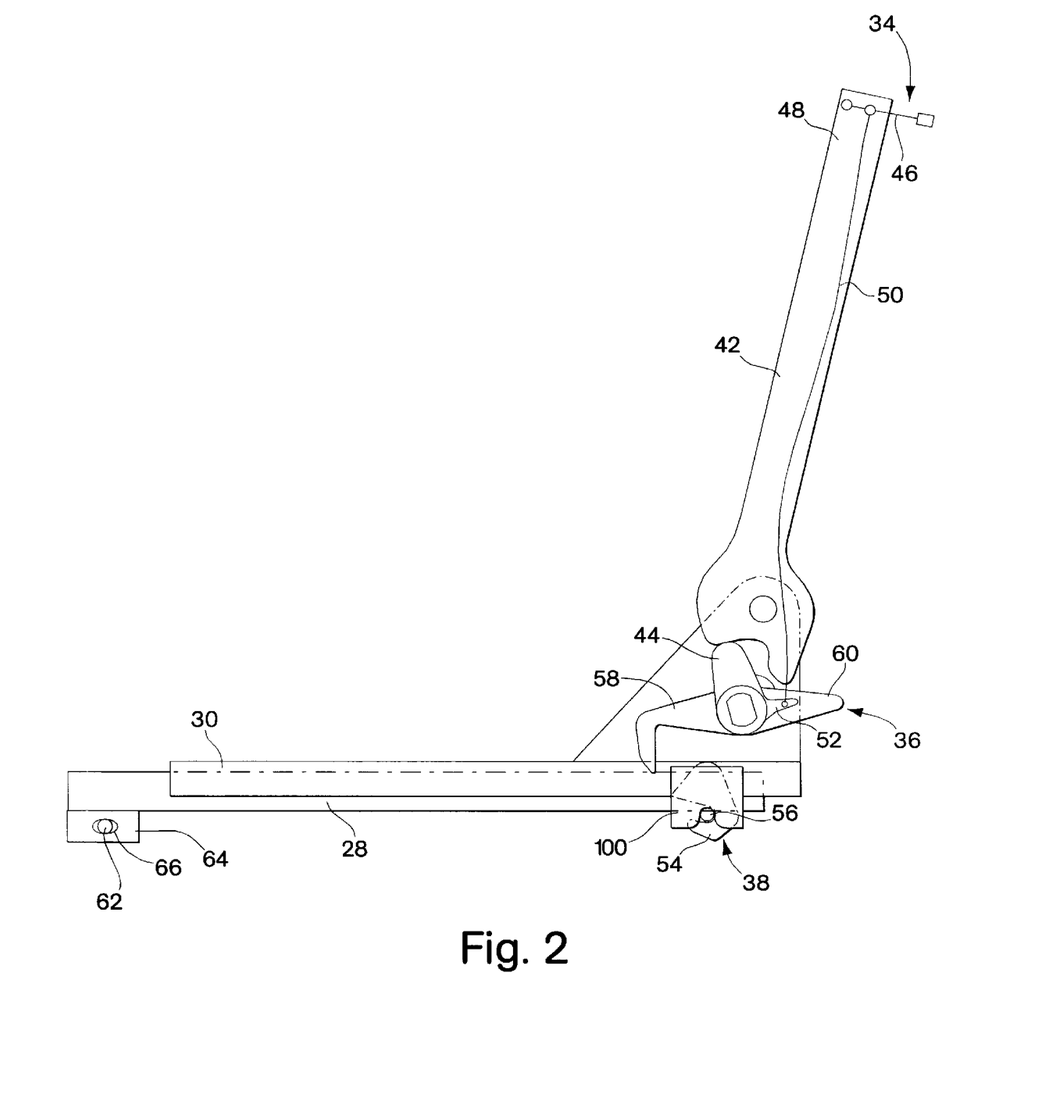
FIG. 2 is a side schematic view of a vehicle seat supported on a seat track in an upright latched position with a first release for controlling pivotal movement of the seat back and a second release for controlling the pivotal movement of the seat bottom.

One embodiment of the subject vehicle seat adjuster is shown in FIG. 2. As discussed above, the mounting assembly 24 is comprised of a first track 28 mounted to a vehicle floor 40 and a second track 30 slidably mounted on the first track 28 such that the seat 20 can be horizontally adjusted within the vehicle. A seat back member 42 pivotally supported with respect to the tracks 28, 30 is and movable between an upright position and a folded position. The seat back member 42 can be any component typically included in the seat back 26, such as a seat frame member, for example.

Figure 3:
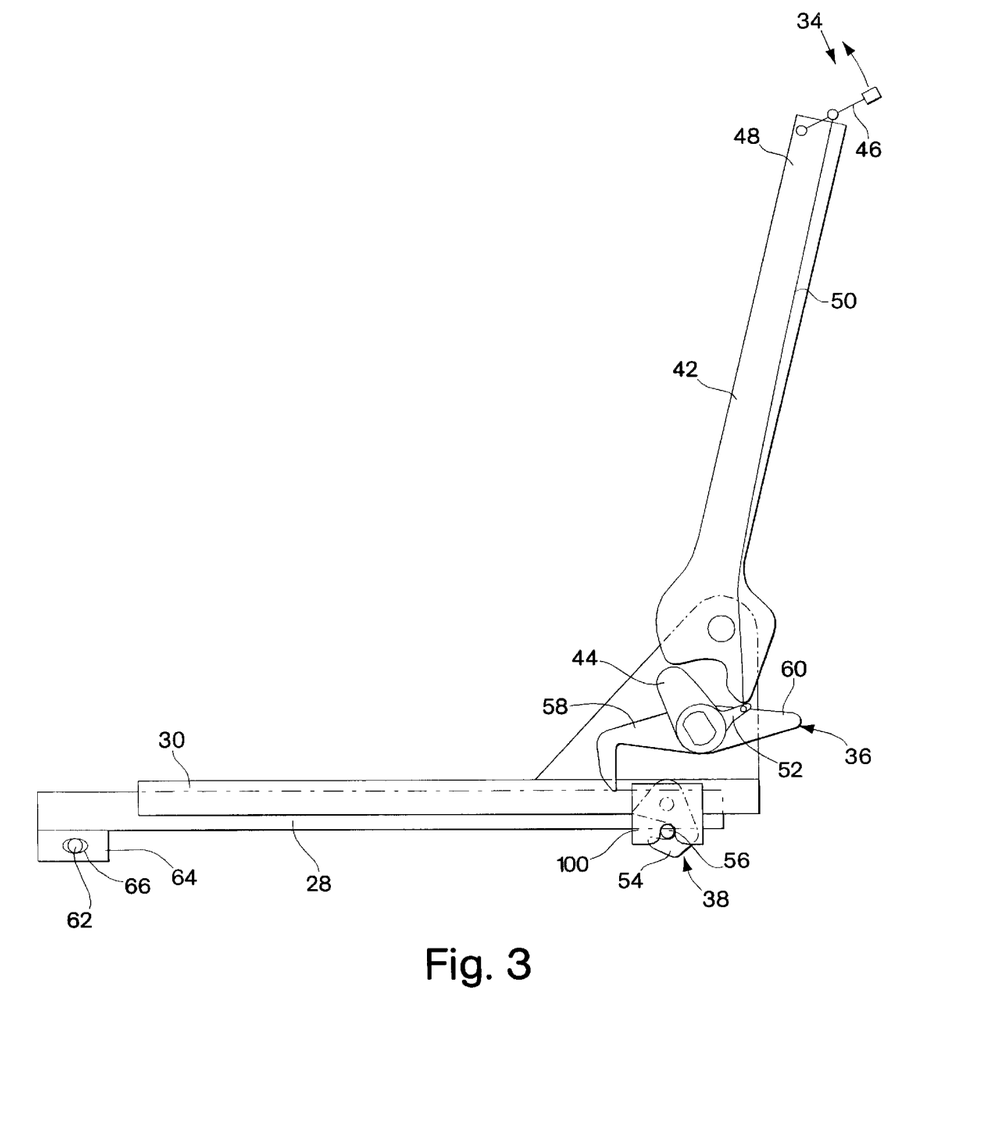
FIG. 3 is the seat of FIG. 2 with the first release in the actuated position.
Figure 4:
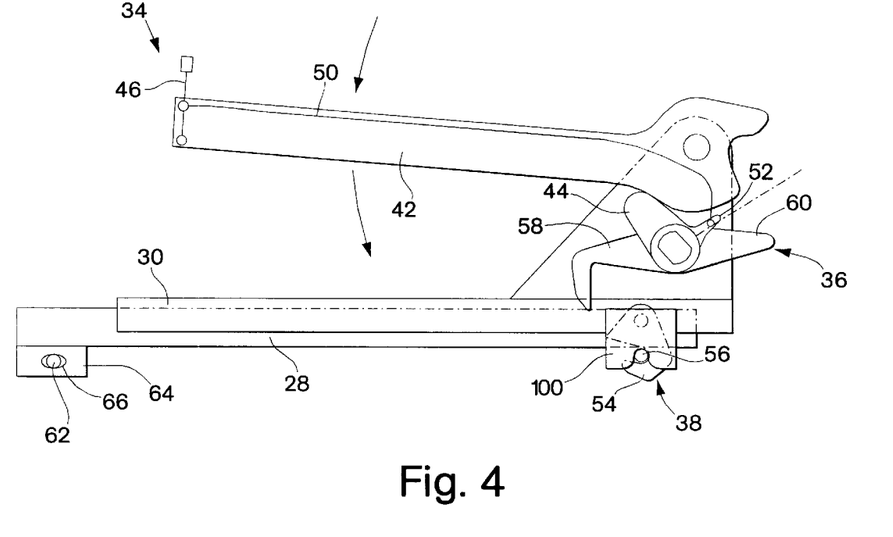
FIG. 4 is the seat of FIG. 2 with the seat back folded onto the seat bottom.

A first lever 44 is rotatably supported with respect to the tracks 28, 30 and is used to control the movement of the seat back member 42 between the upright and folded positions when selectively actuated by the first release 34. The first release 34 can be any type of release in the art, including having an actuator and cable assembly, for example. As shown in FIG. 2, a button or actuator lever 46 is mounted near a top portion 48 of the seat back member 42. A cable 50 extends along the length of the seat back member 42 and operably connects the actuator lever 46 to the first lever 44. The first lever 44 preferably includes a mounting portion or tab 52 to which the cable 50 is attached. The tab 52 can be an extension that is integrally formed on the lever 44 as a single piece, or can be a separate piece that is attached to the lever 44. When the actuator lever 46 is manually actuated, as shown in FIG. 3, the cable 50 pulls upwardly on the tab 52 causing the first lever 44 to rotate. Once the first lever 44 is rotated out of the way, the seat back member 42 can be rotated from a vertical position to a horizontal position, as shown in FIG. 4.

The latch mechanism 38 is used to secure a portion of the mounting assembly 24 to the vehicle floor 40. The latch mechanism 38 is movable between a latched position and an unlatched position and includes a claw 54 that is pivotally mounted to the second track 30. A striker 56 is fixedly mounted to the vehicle floor 40. When the latch mechanism 38 is in the latched position, the claw 54 engages the striker 56 such that the mounting assembly 24 remains fixed relative to the vehicle floor 40.

A second lever 58 is rotatably supported with respect to the tracks 28, 30 and is used to control the movement of the latch mechanism 38 between the latched and unlatched positions when selectively actuated by the second release 36. The second release 36 is preferably an extension 60 of the second lever 58 that extends rearwardly from the seat 20 such that the extension 60 can be manually actuated to rotate the second lever 58. When the second release 36 is actuated, the second lever 58 is rotated and the latch mechanism 38 is moved to the unlatched position. As the second lever 58 is rotated, it engages the claw 54 and rotates away from the striker 56 to release the mounting assembly 24 such that the mounting assembly 24 can be moved from the horizontal position to the vertical position.

Preferably, the seat 20 is pivoted to the vertical or stowed position on a pin shaft 62 that is mounted to the vehicle floor 40. A bracket 64 is mounted to a front portion of the first track 28 and includes a slot 66 for receiving the pin shaft 62. The slot 66 extends horizontally along the first track 38 to allow slight horizontal movement of the pin shaft 62 in the slot 66. The seat tracks 28, 30 are pivoted about an axis of rotation defined by the pin shaft 62 when the latch mechanism is moved to the unlatched position and the seat 20 is flipped to the vertical position.

Figure 5:
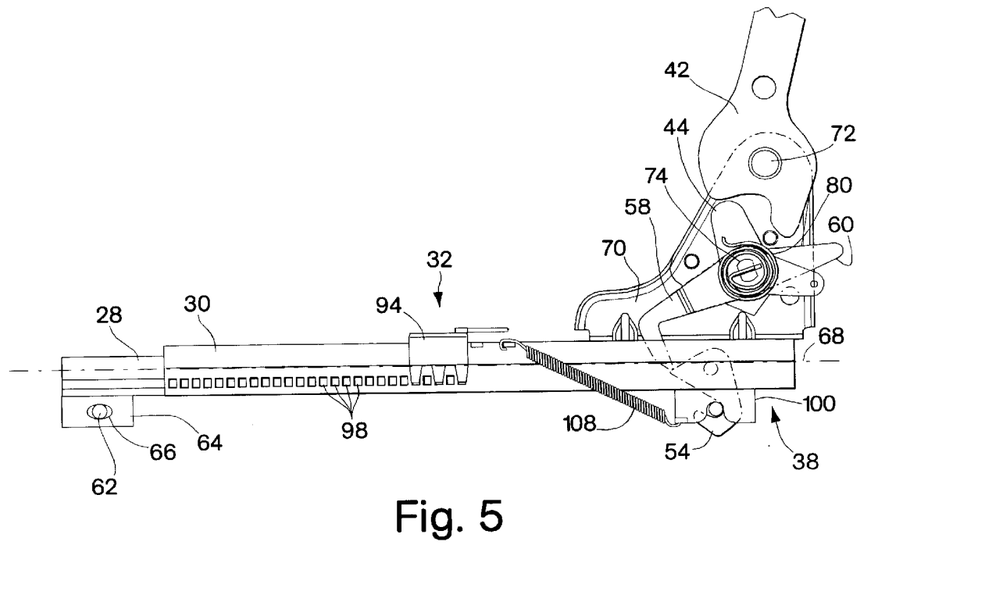
FIG. 5 is a side view of the subject invention in the upright, latched position.

A more detailed view of the seat adjuster assembly is shown in FIG. 5. As discussed above, the mounting assembly 24 is comprised of the first track 28 mounted to the vehicle floor 40 to define a longitudinal axis 68. The second track 30 is supported for movement relative to the first track 28 along the longitudinal axis 68. A pivot bracket 70 is supported on the second track 30 for movement therewith. The seat back member 42 is mounted to the pivot bracket 70 on a first pivot shaft 72 that defines an axis of rotation 76, shown in FIG. 6A. The seat back member 42 is pivoted on the first pivot shaft 72 as the seat back 26 is folded onto the seat bottom 22.

Figure 6A:
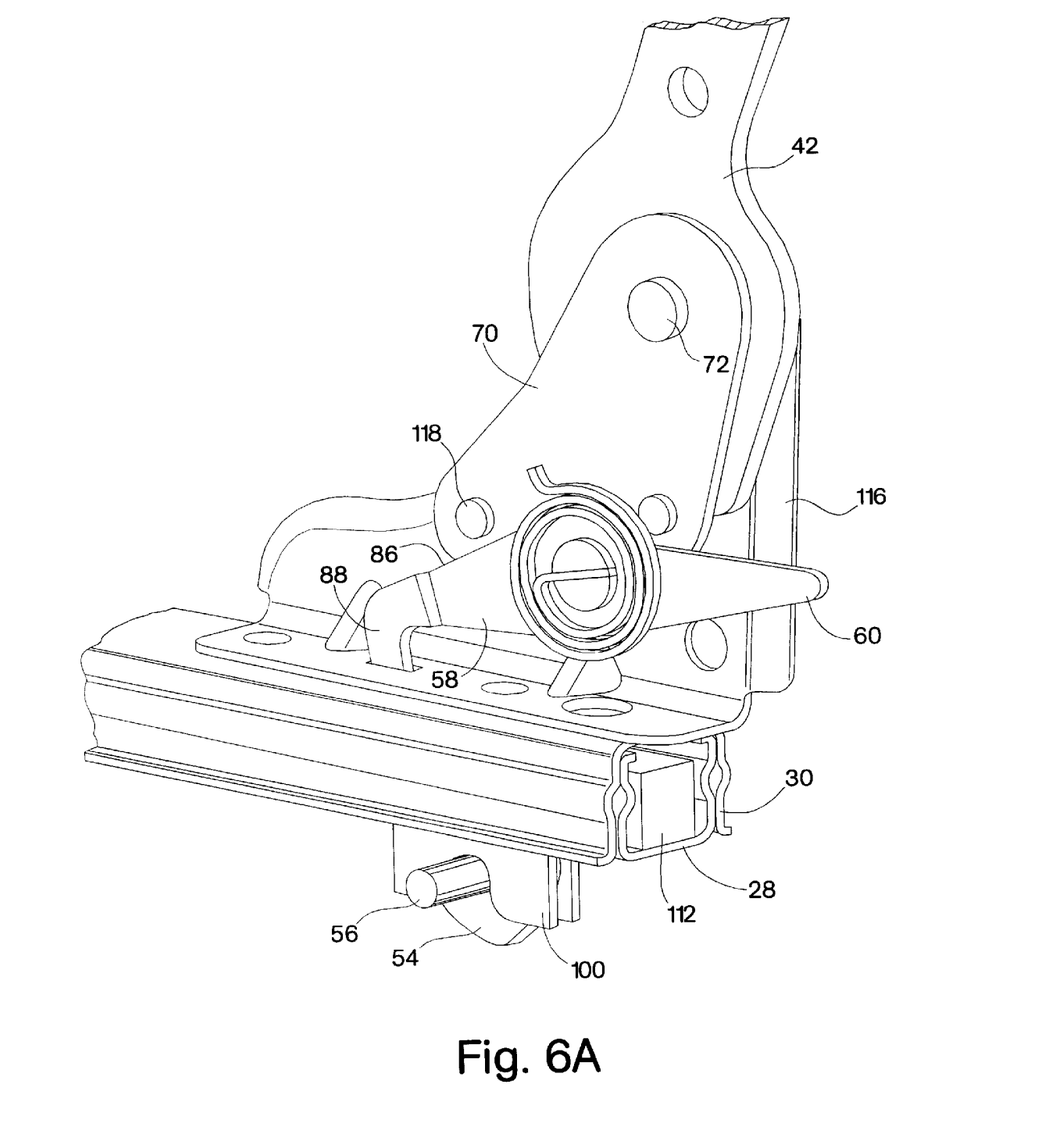
FIG. 6A is a perspective view of the lever and latch mechanism of FIG. 5 in the upright, latched position.
Figure 6B:
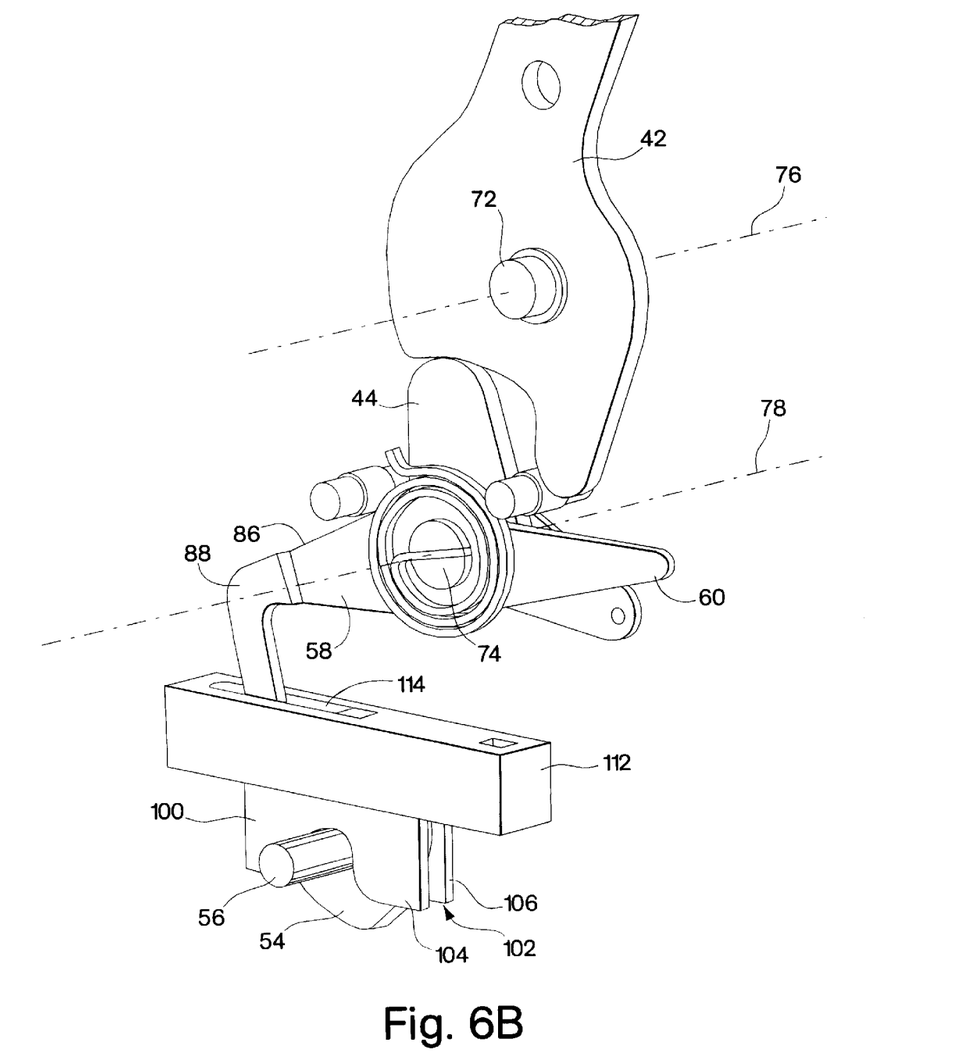
FIG. 6B is a perspective view of the lever and latch mechanism of FIG. 6A without the pivot bracket.

The first 44 and second 58 levers are mounted on a second pivot shaft 74 which defines an axis of rotation 78, shown in FIG. 6B. Preferably the axes of rotation 76, 78 are parallel to each other. The first 44 and second 58 levers are supported on the second pivot shaft 74 for independent rotation about the axis of rotation 78. Thus, the first release 34 rotates the first lever 44 on the second pivot shaft 74 and the second release 60 rotates the second lever 58 on the second pivot shaft 74 independently from the first lever 44. A torsion spring 80 is also mounted to the second pivot shaft 74 for assisting with the return of the seat back member 42 to the upright position.

Figure 6C:
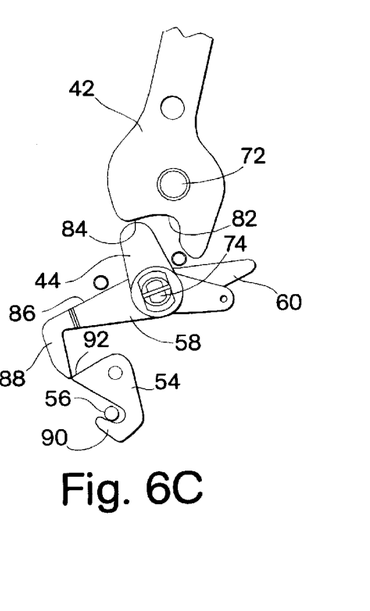
FIG. 6C is a side view of the lever and latch mechanism of FIG. 6A in the upright, latched position.
Figure 7:
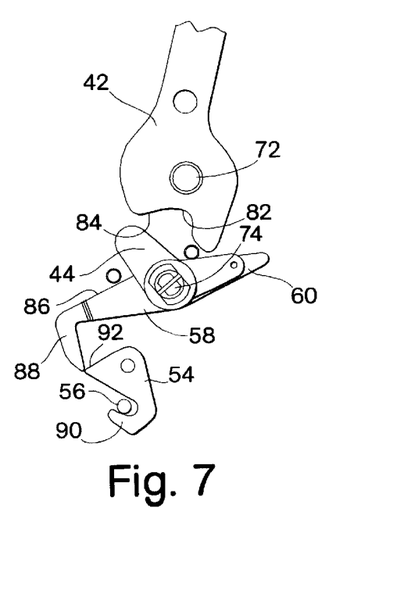
FIG. 7 is a side view of the lever and latch mechanism of FIG. 5 with one lever rotated to a position where the seat back can be folded downwardly toward the seat back.
Figure 8A:
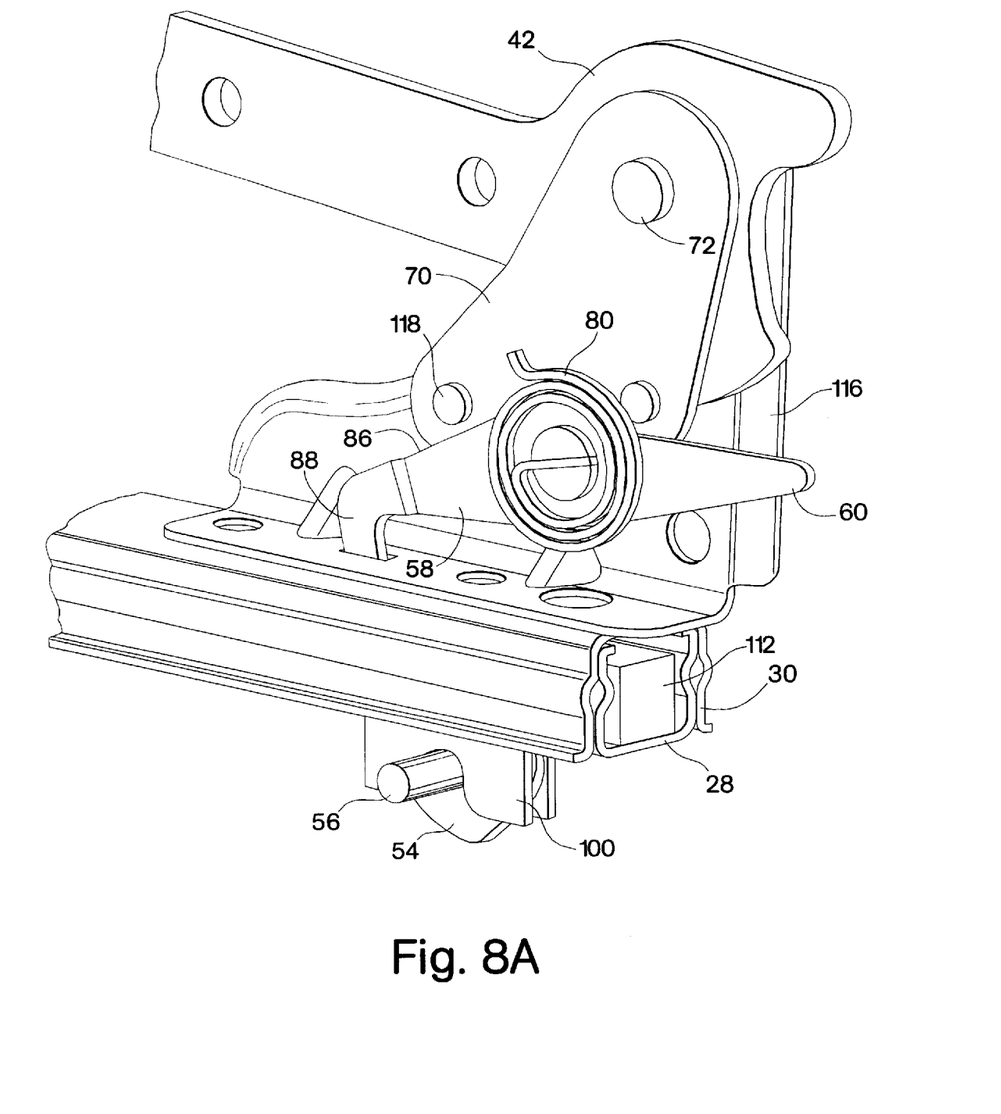
FIG. 8A is a perspective view of the lever and latch mechanism of FIG. 5 in the latched position with the seat back in the folded position.
Figure 8B:
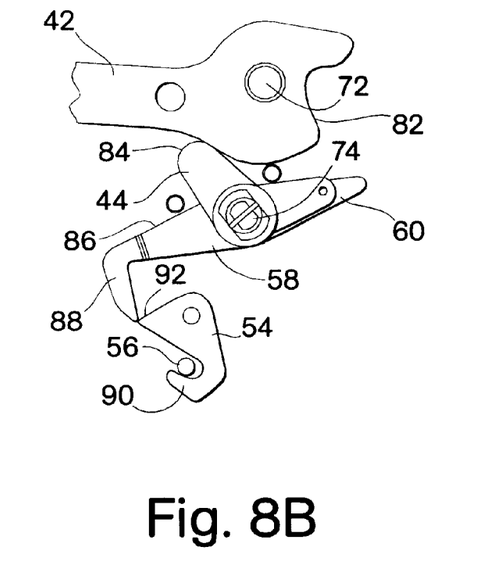
FIG. 8B is a side view of the lever and latch mechanism of FIG. 8A in the latched position with the seat back in the folded position.

As shown in FIG. 6C, the seat back member 42 includes a recess 82 that receives the first lever 44 when the seat back 26 is in the upright position. The first lever 44 includes a cam 84 that engages the recess 82 to prevent the seat back member 42 from moving to the folded position until the first release 34 is actuated. When the first release 34 is actuated, the first lever 44 is rotated about the axis 78 and the cam 84 is moved out of the recess 82, as shown in FIG. 7. Once the cam 84 is moved out of the recess 82 the seat back member 42 can be pivoted to the folded position as shown in FIGS. 8A and 8B FIGS. 8A and 8B show the seat 20 in the folded and latched position. To move the seat 20 to the stowed position the mounting assembly 24 must be unlatched and the seat 20 must be pivoted from the horizontal position to the vertical position. The second lever 58 includes an elongated body 86 with a transversely extending arm 88 at one end that engages the latch mechanism 38 to move the latch mechanism 38 from the latched position to the unlatched position when actuated by the second release 36. As discussed above, the second release 36 is an extension 60 formed on an opposite end of the second lever 58. The extension 60 extends rearwardly from the pivot bracket 70 such that the extension 60 can be manually actuated.

Figure 9A:
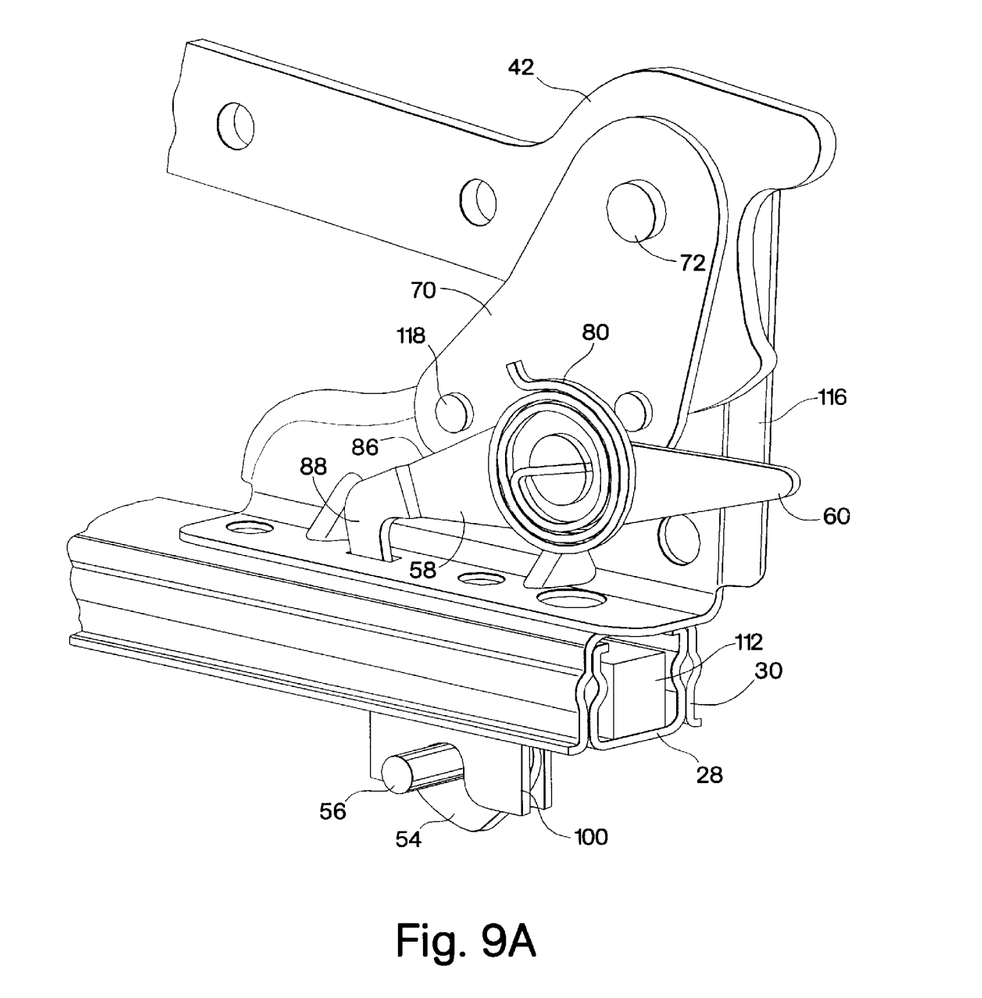
FIG. 9A is a perspective view of the lever and latch mechanism of FIG. 5 in the folded and unlatched position.
Figure 9B:
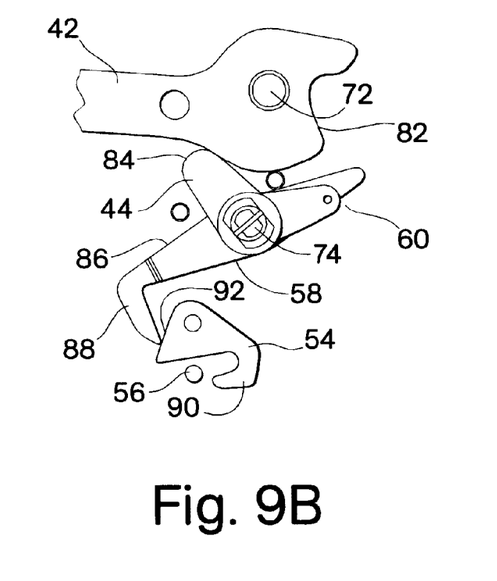
FIG. 9B is a side view of the lever and latch mechanism of FIG. 9A in the folded and unlatched position.

The latch mechanism 38 is mounted to the first track 28 and includes the rotatable claw 54. The claw 54 has a hooked portion 90 that engages the striker 56 mounted to the vehicle floor 40 when the latch mechanism is in the latched position. The arm 88 of the second lever 58 engages a surface 92 on the rotatable claw 54 causing the hooked portion 90 to rotate and disengage from the striker 56 the extension 60 is actuated, as show in FIGS. 9A and 9B.

Figure 10:
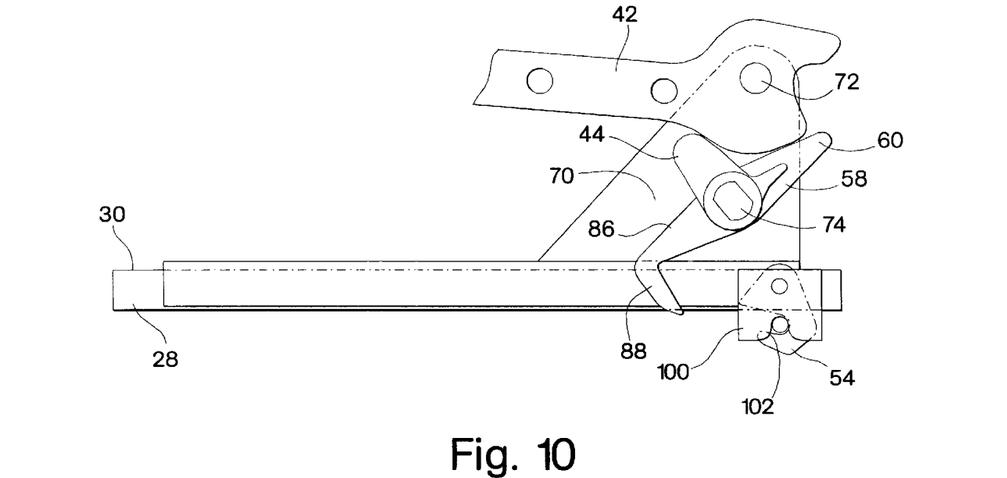
FIG. 10 is a schematic side view of the seat track, lever, and latch mechanism in the latched and folded position with the seat adjusted forwardly.
Figure 11:
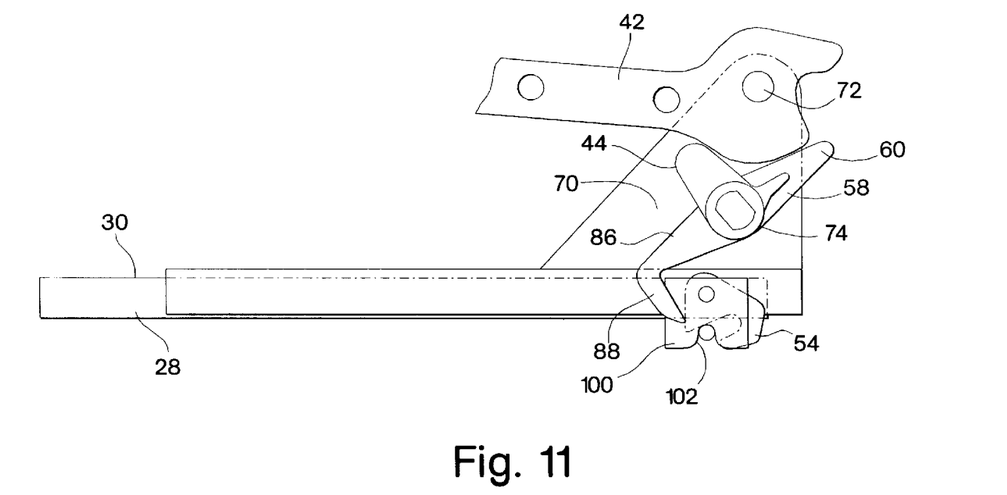
FIG. 11 is a schematic side view of the seat track, lever, and latch mechanism in the latched and folded position with the seat adjusted rearwardly.

FIG. 10 shows the seat back member 42 in the folded position with the latch mechanism 38 in the latched position. The seat 20 is adjusted forwardly on the tracks 28, 30. Note that the arm 88 of the second lever 58 when rotated cannot engage the claw 54. This is because the seat 20 is too far forward. When the seat back member 42 is folded down, the locking mechanism 32 unlocks to automatically move the seat 20 to the rearwardmost position in the vehicle, shown in FIG. 11. In this position, when the arm 88 is rotated, it can engage the claw 54 to unlatch the seat tracks 28, 30 from the striker 56.

The locking mechanism 32 can be any seat track locking mechanism known in the art. As shown in FIG. 5, the locking mechanism 32 can be a locking pawl 94 that is rotatably mounted for movement with the second track 30. The locking pawl 94 includes a plurality of fingers 96 that are received in slots 98 located in the track members 28, 30. When the first release 34 is actuated or when the seat back 26 is in the fully folded position, the locking mechanism 32 is automatically disengaged to allow the seat 20 to be slid to the rearward most position. The locking mechanism 32 includes a resilient member 108 having a spring portion mounted to the second track 30 for biasing the second track 30 to the rearwardmost position with respect to the first track 28. This spring assist allows the seat 20 to be quickly moved to the rearward position. Once the seat 20 is in this position the locking mechanism automatically re-engages. The locking pawl 94 can be disengaged from the tracks 28, 30 by a cable control member (not shown) or by other means known in the art.

As shown in FIGS. 5, 6A, 6B, 8A, and 9A, latch mechanism 38 further includes a locating bracket 100 fixedly mounted to the first track 28 with a centrally located slot 102. The striker 56 mounted to the vehicle floor 40 is located and received within this slot 102 when the mounting assembly 24 is in the latched position. The bracket 100 includes a first leg 104 mounted on one side of the claw 54 and a second leg 106 mounted on an opposite side of the claw 54. The bracket 100 helps to locate the striker 56 with respect to the claw 54 when the seat is returned from the vertical or stowed position to the horizontal or use position.

As shown in FIGS. 6A–B, a block 112 is mounted between the tracks 28, 30. The block is fixed relative to the first track 28 and includes a slot 114 on a top surface through which the arm 88 of the second lever 58 extends to engage the claw 54. Also shown in FIGS. 6A–B, is a secondary bracket member 116. The secondary bracket member 116 is mounted to the pivot bracket 70 between the first 44 and second 58 levers by a plurality of fasteners 118 as is known in the art.

Figure 12:
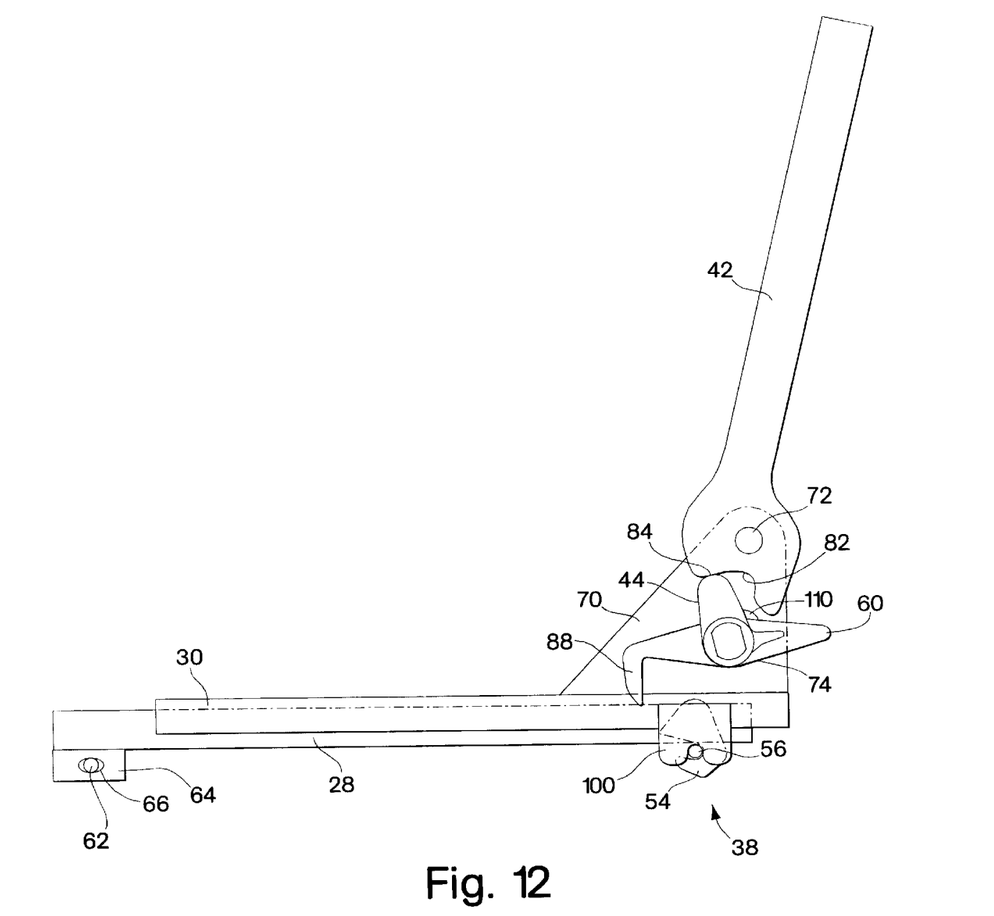
FIG. 12 is a schematic side view of an alternate embodiment in the upright, latched position.
Figure 13:
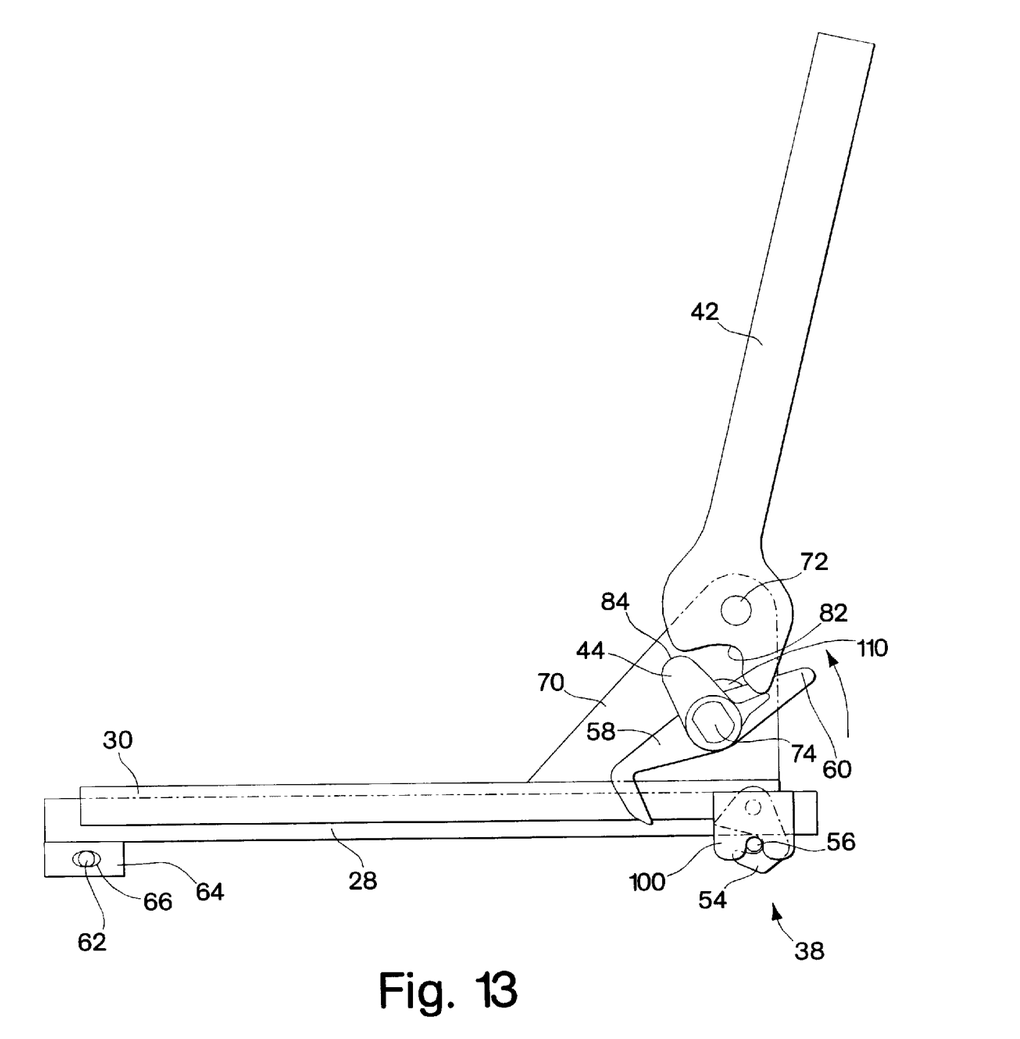
FIG. 13 is a schematic side view of the embodiment shown in FIG. 12 with one lever rotated such that the seat back can be folded downwardly toward the seat bottom.
Figure 14:
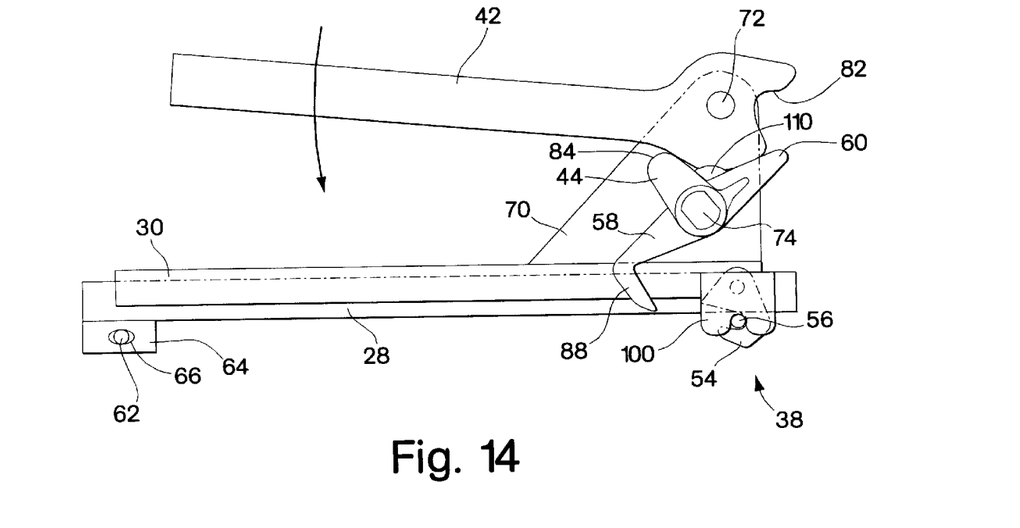
FIG. 14 is a schematic side view of the embodiment shown in FIG. 12 with the seat back folded onto the seat bottom with the seat adjusted forwardly.
Figure 15:
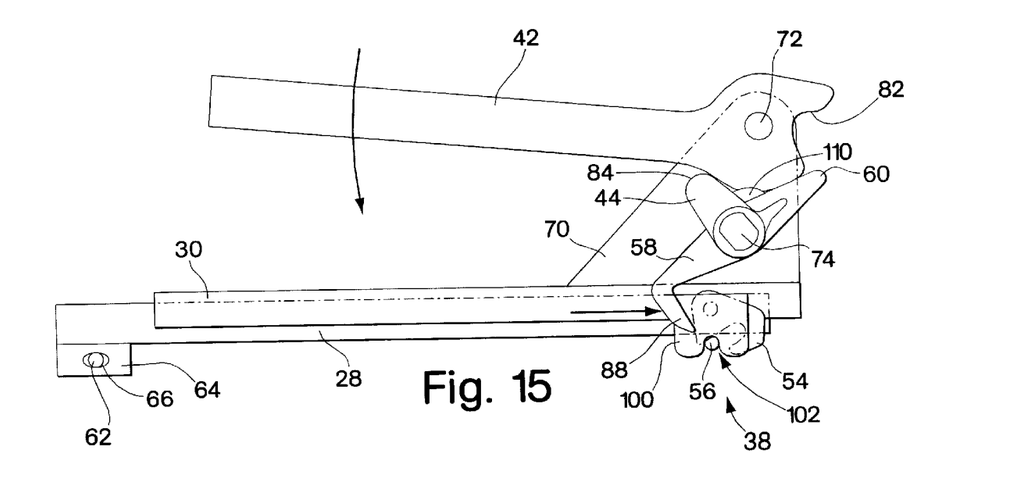
FIG. 15 is a schematic side view of the embodiment shown in FIG. 12 in the unlatched position with the seat adjusted rearwardly.

An alternate embodiment of the latch and lever mechanism is shown in FIGS. 12–15. In this embodiment, the first 34 and second 36 releases are combined into a single control assembly. FIG. 12 shows the seat back member 42 in the upright position with the latch mechanism 38 in the latched position. The first 44 and second 58 levers are mounted on the common pivot shaft 74 as discussed with regard to the previous embodiment. In this configuration, however, the second lever 58 includes a hook tab 110 for engaging the first lever 44 when the extension 60 is actuated to allow the seat back member 42 to move from the upright position to the folded position.

One advantage with this configuration is that a single release is used to perform both the folding and the unlatching functions. As the extension 60 is rotated upwardly, shown in FIG. 13, the hook tab 110 engages the first lever 44 causing the cam 84 of the first lever 44 to rotate out of the recess 82 of the seat back member 42. Once the first lever 44 is in this the seat back member 42 can be folded downwardly toward the seat bottom 22, shown in FIG. 14. Note that the arm 88 of the second lever 58 is not positioned to engage the claw 54 and the latch mechanism remains in the latched position. When the seat 20 is moved to the rearwardmost position, shown in FIG. 15, the arm 88 can engage the claw 54 to move the latch mechanism 38 to the unlatched position when the extension 60 is rotated. Once the seat 20 is unlatched, it can be pivoted upwardly to the stowed position.

The operation of folding the seat back 26 onto the seat bottom 22 and subsequently flipping the seat back 26 and bottom 22 to a stowed position in a vehicle is described below. The first lever 44 is rotated and the seat back 26 is folded down on the seat bottom 22. The locking device 32 is unlocked, the second track 30 is moved to a rearwardmost position relative to the first track 30, and the locking device is re-engaged. The second lever 58 is then rotated to unlatch the latch mechanism 38. Finally, the seat bottom 22, seat back 26, and tracks 28, 30 are flipped upwardly to a stowed position.

In one embodiment a first release 34 is actuated to rotate the first lever 44 to a pre-selected position where the seat back 26 can be moved from the upright position to the folded position and a second release 36 is used to rotate the second lever 58 to move the latch mechanism 38 to the unlatched position such that the seat bottom 22 can be flipped upwardly. In another embodiment a single release 60 is actuated to rotate the first 44 and second 58 levers to fold and flip the seat 20.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A vehicle seat adjuster assembly comprising, in combination:
    a mount movable between a horizontal position and a vertical position;
    a seat back member pivotally supported with respect to said mount and movable between an upright position and a folded position;
    wherein the mount comprises a first track member fixed to said vehicle structure and defining a longitudinal axis, a second track supported for movement relative to said first track along said longitudinal axis, and a pivot bracket supported on said second track for movement therewith, said seat back member being mounted to said pivot bracket;
    a first lever portion rotatably supported with respect to said mount for controlling the movement of said seat back member between said upright and folded positions when selectively actuated by a control assembly;
    a latch mechanism for securing a portion of said mount to a vehicle structure, said latch mechanism being movable between a latched position and an unlatched position;
    a second lever portion rotatably supported with respect to said mount for controlling the movement of said latch mechanism between said latched and unlatched positions when selectively actuated by said control assembly such that said mount can be moved from said horizontal position to said vertical position when said latch is in said unlatched position; and
    a pivot shaft defining a first axis of rotation, said first and second lever portions being supported on said pivot shaft for independent rotation about said first axis of rotation.

2. An assembly as recited in claim 1 including a second pivot shaft defining a second axis of rotation, said seat back member being supported on said second pivot shaft to rotate between said upright and folded positions wherein said second axis of rotation is parallel to said first axis of rotation.

3. An assembly as recited in claim 1 wherein said first lever portion includes a cam for engaging said seat back member to prevent movement from said upright position to said folded position unless said first lever portion has been actuated by said control assembly.

4. An assembly as recited in claim 3 wherein said second lever portion includes an elongated body with a transversely extending arm at one end that engages said latch mechanism to move said latch mechanism from said latched position to said unlatched position when actuated by said control assembly.

5. An assembly as recited in claim 4 wherein said control assembly is comprised of an extension formed on an opposite end of said second control lever from said arm, said extension extending rearwardly from said pivot bracket such that said extension can be manually actuated and wherein said second lever portion includes a hook tab for engaging said first lever portion when said extension is actuated to allow said seat back member to move from said upright position to said folded position.

6. An assembly as recited in claim 1 wherein said latch mechanism is mounted to said first track and is comprised of a rotatable claw having a hook extension that engages a striker mounted to said vehicle structure when said latch mechanism is in said latched position and wherein said second lever portion engages a surface on said rotatable claw causing said hook extension to rotate and disengage said pin when selectively actuated by said control assembly.

7. An assembly as recited in claim 6 wherein said latch mechanism further includes a locating bracket fixedly mounted to said first track and having a slot for receiving said pin as said mount is moved from said vertical position to said horizontal position.

8. An assembly as recited in claim 1 wherein said control assembly is comprised of a first release operably connected to said first lever portion and a second release operably connected to said second lever portion.

9. An assembly as recited in claim 8 wherein said first release includes an actuator mounted to a top portion of said seat back member and a cable having one end connected to said actuator and an opposite end connected to a tab on said first lever portion.

10. An assembly as recited in claim 9 wherein said second lever portion is rotatably mounted to said pivot bracket and said second release is comprised of an extension formed on one end of said second lever portion that extends rearwardly from said pivot bracket such that said extension can be manually actuated.

11. An assembly as recited in claim 1 including a track lock mounted to said second track and movable between a locked position where said second track is prevented from moving with respect to said first track and an unlocked position where said second track is movable relative to said first track along said longitudinal axis wherein said track lock is moved to said unlocked position when said seat back member is moved to said folded position.

12. An assembly as recited in claim 11 including a resilient member having a spring portion mounted to said second track for biasing said second track to a rearwardmost position with respect to said first track when said seat back member has been moved to said folded position.

13. An assembly as recited in claim 1 including a front pivot mount comprised of a slot extending longitudinally along a front portion of said first track and a pivot pin received in said slot and fixed to a vehicle structure to define an axis of rotation and wherein said latch mechanism is mounted to a rear portion of said first track such that said when said second lever portion moves said latch mechanism to said unlatched position, said first and second tracks are pivoted to said vertical position about said axis of rotation.

14. A vehicle seat assembly comprising, in combination:
    a first track;
    a second track supported for movement relative to said first track;
    a seat bottom supported on said second track for movement with said second track and movable between a horizontal position and a vertical position;
    a seat back pivotally supported for pivotal movement relative to said seat bottom between an upright position and a folded position;

a first lever rotatably supported with respect to said second track for controlling the movement of said seat back between said upright and folded positions when selectively actuated by a control assembly;

a latch mechanism for securing a rear portion of said first track to said vehicle structure, said latch mechanism being movable between a latched position and an unlatched position;

wherein said latch mechanism is comprised of a cam rotatable mounted to said first track and which includes a hook portion that engages a pin mounted to said vehicle structure when said latch mechanism is in said latched position; and a second lever rotatably supported with respect to said second track for controlling the movement of said latch mechanism between said latched and unlatched positions when selectively actuated by said control assembly such that said seat bottom can be moved from said horizontal position to said vertical position when said latch is in said unlatched position;

wherein said second lever is comprised of an elongated body with a transversely extending arm at one end that engages said cam to rotate said hook portion away from said pin to move said latch mechanism to said unlatched position when actuated by said control assembly.

15. An assembly as recited in claim 14 wherein said control assembly is comprised of a first release mounted to an upper portion of said seat back and a second release mounted for movement with said seat bottom, said first release being operably connected to said first lever and said second release being operably connected to said second lever.

16. An assembly as recited in claim 15 wherein said first release is comprised of an actuator extending outwardly from said seat back and a cable extending from said actuator to a tab on said first lever, and said second release is comprised of an extension formed at one end of said second lever and extending rearwardly from said seat bottom such that said extension can be manually actuated.

17. An assembly as recited in claim 14 including a pivot bracket mounted to said second track for movement therewith and a pivot shaft rotatably supported on said pivot bracket wherein said first and second levers are pivotally mounted on said pivot shaft.

18. An assembly as recited in claim 14 including a pin mount for securing a front portion of said first track to said vehicle structure, said pin mount comprising a slot extending horizontally along said first track and a shaft defining an axis of rotation such that said seat bottom and said first and second tracks rotate about said axis of rotation when said latch mechanism is moved to said unlatched position and said seat bottom is moved to said vertical position.

19. An assembly as recited in claim 14 including a locking device supported on said second track for movement between a locked position where said locking device maintains said second track in a selected position relative to said first track and an unlocked position where said second track is movable relative to said first track and including and a resilient spring having one spring end mounted to said second track and being biased to move said second track to a rearwardmost position relative to said first track when said locking device is in said unlocked position wherein said locking device is moved to said unlocked position when said seat back is moved to said folded position.

20. A vehicle seat adjuster assembly comprising, in combination:

a mount movable between a horizontal position and a vertical position;

a seat back member pivotally supported with respect to said mount and movable between an upright position and a folded position;

wherein the mount comprises a first track member fixed to said vehicle structure and defining a longitudinal axis, a second track supported for movement relative to said first track along said longitudinal axis between a forward position and a full rear position, and a pivot bracket supported on said second track for movement therewith, said seat back member being mounted to said pivot bracket;

a first lever portion rotatable supported with respect to said mount for controlling the movement of said seat back member between said upright and folded positions when selectively actuated by a control assembly;

a latch mechanism for securing a portion of said mount to a vehicle structure, said latch mechanism being movable between a latched position and an unlatched position; and a second lever portion rotatable supported with respect to said mount for controlling the movement of said latch mechanism between said latched and unlatched positions when selectively actuated by said control assembly such that said mount can be moved from said horizontal position to said vertical position when said latch is in said unlatched position;

wherein the second lever portion only moves the latch to the unlatched position when the second track is in the full rear position.

21. The vehicle seat adjuster assembly of claim 20 wherein the latch mechanism further comprises a rotatable cam having a hook extension that engages a pin mounted to said vehicle structure when said latch mechanism is in said latched position and wherein said second lever portion engages a surface on said rotatable cam causing said hook extension to rotate and disengage said pin when the second track is in the full rear position.

22. The vehicle seat adjuster assembly of claim 20 further comprising a locking mechanism releasably securing the second track to the first track, wherein upon actuation of the first lever to move the seat back member to the folded position the locking mechanism is disengaged, permitting the second track to move with respect to the first track until the second track moves to the full rear position.

* * * * *